Jan. 4, 1949.　　　O. R. NEMETH　　　2,457,915
FILM GATE

Filed July 8, 1946　　　　　　　　　　2 Sheets-Sheet 1

INVENTOR.
Otto R. Nemeth
BY
L. F. Hammand
Atty.

Jan. 4, 1949. O. R. NEMETH 2,457,915
FILM GATE
Filed July 8, 1946 2 Sheets-Sheet 2
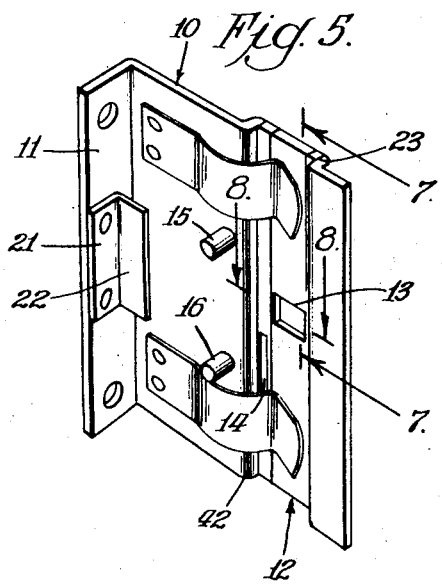
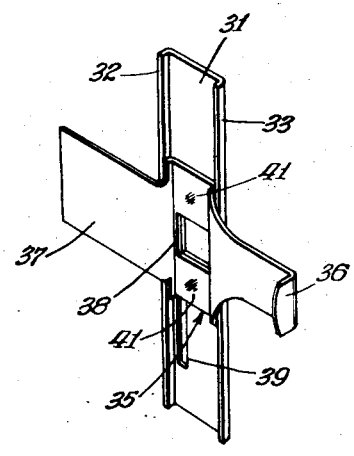
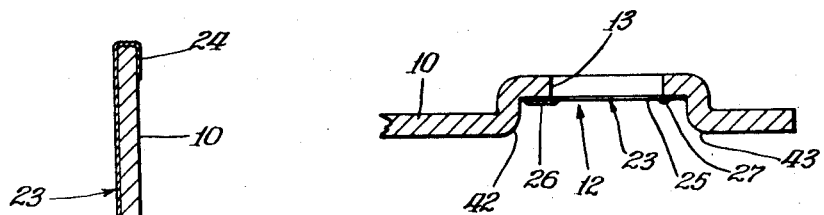
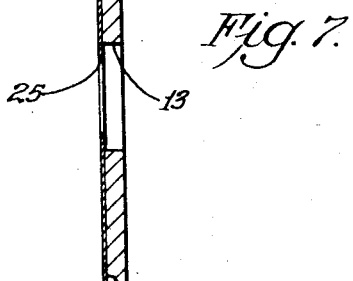
INVENTOR.
Otto R. Nemeth
BY
L. F. Hammand
Atty Patented Jan. 4, 1949

2,457,915

UNITED STATES PATENT OFFICE 2,457,915

FILM GATE

Otto R. Nemeth, Chicago, Ill., assignor to Otto R. Nemeth, Inc., Chicago, Ill., a corporation of Delaware Application July 8, 1946, Serial No. 682,079

9 Claims. (Cl. 88—17)

This invention relates to projection equipment for 16 millimeter motion picture film and is specifically directed to a film gate having features of novelty not believed to have been known in the prior art.

It may be stated in introduction that in all forms of moving picture projectors commonly known and used, the film gate is a rather complex mechanism having a number of closely fitted parts which require maintenance of difficult tolerances in the process of manufacture and no not lend themselves to factory methods of assembly. These types of structures are difficult to manufacture, since the precision required by the various individual parts is high and the cost of production is necessarily excessive. Moreover, so far as known to the applicant, none of the film gates of the prior art have included features that provide for the simplicity and ease of inserting or removing the film that is accomplished by the present invention, nor do the prior art devices permit disassembly and cleaning by anything approaching the simple manner in which these operations are now accomplished.

It is the general aim of this invention to provide a film gate of extremely simple and rugged design, so that it may be constructed of a relative small number of parts with a material reduction of manufacturing costs as compared to prior devices; yet at the same time to provide a film gate that is more satisfactory in operation and more conveniently threaded than any heretofore known.

A principal object of the invention resides in the provision of a film gate having a completely removable pressure plate which is maintained in position only by springs, so that it may be instantly removed for cleaning, or to permit cleaning of the main structure of the film gate on which it is mounted.

Another object of the invention is to provide a film gate having a simplified arrangement for opening and closing the gate, so that the film may be inserted or removed instantly and so that no mechanical knowledge is required on the part of the operator in order to successfully operate the projector.

A further object of the invention resides in the provision of a film gate so designed that the edges of the film aperture may be cut cleanly and sharply without the necessity of milling or broaching operations, so that the expense of such operations is avoided and yet so that the edges of the image projected on the screen will be absolutely sharp and straight and show no irregularities due to imperfect surfaces on the film gate aperture.

All of the foregoing objects are accomplished in the invention here described by the provision of a film gate in which the frame consists of a single bracket formed to include a film channel, together with a pressure plate entirely separate from the bracket and maintained in operating position only by a pair of leaf springs. The several parts of the mechanism are so designed that they are maintained in operating position by the action of the springs, but can be instantly opened by merely touching a handle attached to the pressure plate and when opened will maintain themselves in open position to permit manual insertion of the film. Furthermore, since the pressure plate is not permanently connected to the main film gate structure as by hinges, slides or other conventional means, the entire pressure plate may be removed by simply grasping the handle and drawing it outwardly. This gives complete access to the film channel and permits easy cleaning, inspection, or removal of foreign substances.

Referring more specifically to the drawings attached to and forming a part of this specification:

Figure 5 is a perspective view of the film gate with the pressure plate removed;

Figure 6 is a perspective view of the pressure plate assembly;

Figure 7 is an enlarged sectional view taken substantially on the plane of the line 7—7 of Figure 5; and Figure 8 is an enlarged detail sectional view taken substantially on the plane of the line 8—8 of Figure 5.

Figure 1:
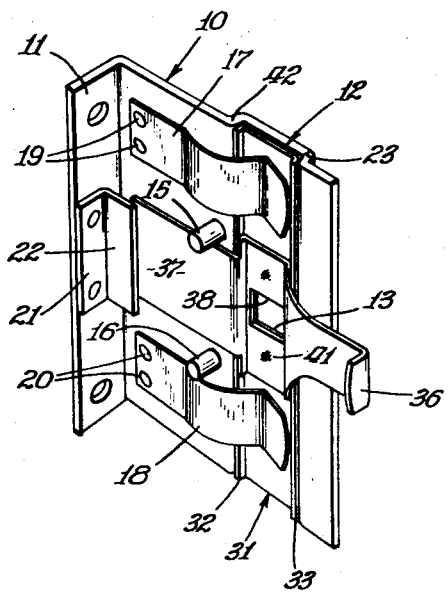
Figure 1 is a perspective view of a film gate constructed in accordance with the teachings of this invention.

The film gate includes a main frame in the form of a bracket which may be a sheet metal stamping formed to include a mounting flange 11 at right angles to the main face portion 10 of the bracket. The flat face surface 10 of the bracket is formed to provide a film channel 12 extending vertically the entire length of the bracket. This film channel is of proper width to accommodate a strip of 16 mm. film and defines a path for the film passing through the gate. The bracket is pierced with a rectangular aperture 13 near the center of the film channel and a vertically extending slot 14 is provided to accommodate the teeth of a conventional film advancing mechanism. The bracket 10 also carries a pair of pins 15 and 16 positioned somewhat behind the film channel 12 and a pair of flat leaf springs 17 and 18 are secured to the bracket by rivets 19 and 20. The bracket 10 also carries a small angle plate 21 riveted to the mounting flange 11 and having a flange 22 extending outwardly in a position parallel with but spaced from the face portion 10 of the bracket. The film channel 12 is provided with a very thin sheet metal facing strip 23 approximately the width of the channel and extending the full length of the channel from the top of the bracket to the bottom. The facing strip 23 is secured in position by end tabs 24 folded over the top and bottom edges of the bracket 10 and clamped against the rear surface of the stamping. The facing strip 23 is preferably constructed of soft iron or sheet steel about .012 inch in thickness and is pierced with an aperture 25 substantially in alignment with the aperture 13 with the main bracket 10 but somewhat smaller both in vertical and horizontal dimensions, so that the extremely thin edge of the sheet metal facing strip 23 actually defines the optical limits of the film gate and the relatively rough edges of the thicker metal of the structural parts of the gate do not cast images of their irregularities on the screen. The facing strip 23 may also be formed to include a conventional form of film slides 26 and 27 to facilitate movement of the film through the gate.

The pressure plate assembly consists of a pair of stampings riveted or otherwise secured to each other but completely separable from the bracket 10 and other parts heretofore described. The pressure plate itself is a sheet metal strip 31 approximately the width of the film channel 12 and of a vertical length equal to the vertical dimension of the bracket 10. It is formed with a pair of side flanges 32 and 33 and may include raised film slides 34. The handle portion of the pressure plate assembly may also be a sheet metal stamping including a channel shaped central portion 35 with extensions on both sides to provide a forwardly extending handle 36 and rearwardly extending arm 37 which in the normal operation of the device assumes a position between the flange 22 of angle plate 21 and the flat face of the bracket 10. The pressure plate 31 and the channel 35 of the handle are both pierced with a rectangular aperture 38 slightly larger than the aperture 25 in the thin facing strip and the handle is secured to the pressure plate by riveting or spot welding at 41. A vertical slot 39 is provided to give clearance for the film advancing devices.

Figure 2:
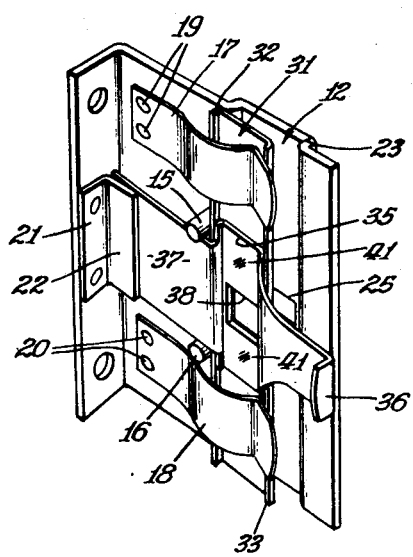
Figure 2 is a perspective view similar to Figure 1, but showing the several parts of the structure in open position.
Figure 3:
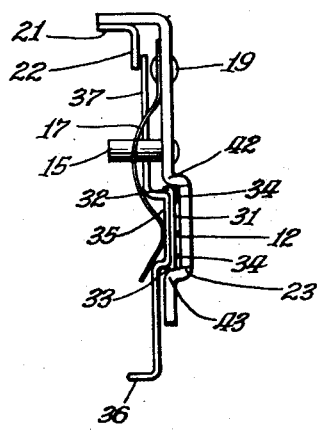
Figure 3 is a plan view of the film gate in operating position.
Figure 4:
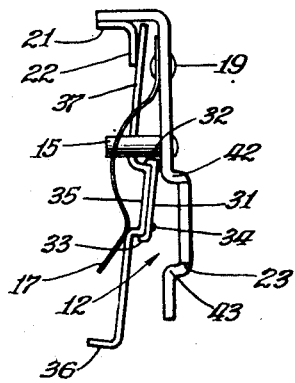
Figure 4 is a plan view with the parts shown in open position.

The extreme simplicity of operation of the film gate should be instantly apparent by a comparison of Figures 1 and 2 of the drawings, where it will be seen that when the gate is in operating position the pressure plate is maintained in the film channel by the springs 17 and 18 and a very light pressure is maintained on the film. The film gate may be opened and film inserted into the channel or removed by simply touching the handle 37 of the pressure plate and moving it inwardly. As this is done the flange 32 of the pressure plate will engage the rounded edge 42 of the film channel and these surfaces will act as cams to lift the pressure plate out of the channel against the action of the springs. Rearward movement of the pressure plate is limited by the pins 15 and 16 so that the inner edge of the pressure plate will lie against the flat surface of the bracket 10 and hold the gate open. The springs 17 and 18 exert a tendency to rock the pressure plate about the flange 32 and swing it toward the closed portion, but the rearwardly extending arm 37 is in engagement with the flange 22, which serves to hold the parts in open position as shown in Figures 2 and 4.

The pressure plate may be removed by simply grasping the handle 36 and drawing it outwardly. Here again the flange 33 of the plate will ride up on the curved wall 43 of the film channel to lift the plate from the film and permit the handle and pressure plate to be completely withdrawn. The appearance of the parts when separated is shown in Figures 5 and 6, and it should be noted that the film channel is completely open, so that any of its surfaces may be easily cleaned or inspected.

From the foregoing it will be seen that the teachings of the present invention provide for the manufacture of a film gate of far greater simplicity than those heretofore known. Further, this simplified film gate is of such mechanical design that it may be constructed entirely of sheet metal stampings and may thus be manufactured at an unusually low cost. Despite the low cost of manufacture, however, the finished product is superior to other devices commonly used, since it possesses an unprecedented ease of operation in opening and closing the gate for the insertion or removal of the film and since cleaning of the gate is greatly simplified. In addition, the provision of the very thin facing strip over the light aperture makes it possible to pierce this aperture by a simple punching operation, without the necessity of resorting to a broaching or milling operation to finish the edges. Experience has shown that it is not practicable from a manufacturing standpoint to attempt to form an optical aperture in metal having sufficient thickness to possess the required structural strength without resorting to a milling or broaching operation, since the very high degree of magnification of the projector lenses causes any microscopic irregularities in the aperture edges to appear very plainly on the screen. By providing a thin metal facing, however, a clean sharp edge may be pierced by a single punching operation, and since it is the somewhat smaller aperture in the facing strip that defines the projection area on the screen, straight, sharp, edges may be obtained without incurring manufacturing costs typical of prior devices.

The exact form of the invention shown in the drawings and described in this specification is a present preferred embodiment of the inventive concept and is believed well illustrative of the inventive thought involved; but it is anticipated that the invention is subject to various modifications, and it should be recognized that the scope of this invention extends to any device coming within the terms of the appended claims.

Having thus described the invention, what I claim as new and desire to protect by United States Letters Patent is:

1. In a film gate for motion picture projectors, the combination of a frame element consisting of a sheet metal stamping having a mounting portion and a flat face portion, with a film channnel formed in the face portion; together with a pressure plate consisting of a sheet metal stamping adapted to be positioned within the aforementioned film channel; a handle for the pressure plate, and spring means positioned to engage the pressure plate and normally maintain it in the film channel; said pressure plate and film channel having cooperating cam surfaces adapted to lift the plate from the channel and maintain it in spaced relationship with the channel in response to manual manipulation of the handle.

2. In a film gate for motion picture projectors, the combination of a frame element including a film channel, together with a pressure plate adapted to frictionally engage the film within the aforementioned film channel, a handle for the pressure plate, interengaging parts comprising a loose pivotal connection between the pressure plate and the frame at one side of the film channel, spring means to engage the pressure plate and normally maintain it in the film channel; said pressure plate and film channel having cooperating surfaces between the film channel and the said pivotal connection adapted to maintain the pressure plate in spaced relationship with the film channel to permit the insertion of film in the channel.

3. In a film gate for motion picture projectors, the combination of a frame element consisting of a sheet metal stamping having a mounting portion and a flat face portion, with a film channel formed in the face portion; together with a pressure plate including a sheet metal stamping adapted to be positioned within the aforementioned film channel; a pair of flat leaf springs each secured to the face plate at one end and having their other ends positioned to engage the pressure plate and normally maintain it in the film channel, and extensions on the pressure plate including a manually operable handle extending outwardly from the pressure plate to a point beyond the limits of the frame stamping and an arm extending from the pressure plate rearwardly to a position adjacent the mounting portion of the frame element, together with stop means to limit the rearward movement of the pressure plate and means to engage the said arm to restrain the pressure plate against movement when the film gate is open.

4. In a film gate for motion picture projectors, the combination of a frame element having a mounting portion and a film channel; together with a pressure plate adapted to be positioned within the aforementioned film channel; spring means to engage the pressure plate and normally maintain it in the film channel, and extensions on the pressure plate including a manually operable handle and an arm extending from the pressure plate rearwardly to a position adjacent the mounting portion of the frame together with stop means to limit the rearward movement of the pressure plate and means to engage the said arm to restrain the pressure plate against movement when the film gate is open.

5. In a film gate for motion picture projectors, the combination of a frame element having a mounting portion and a film channel; together with a pressure plate adapted to be positioned within the aforementioned film channel; a pair of springs each secured to the frame at one end and having their other ends positioned to engage the pressure plate and normally maintain it in the film channel, together with stop means to limit the rearward movement of the pressure plate and means to restrain it against movement when the film gate is open.

6. In a film gate, the combination of a frame including an aperture and a film channel extending across the aperture, with longitudinally extending friction surfaces in the channel, and side walls at the opposite edges thereof; a pressure plate including an aperture in registry with the aperture of the frame, and friction surfaces on the pressure plate adapted to engage the film and urge it against the friction surfaces within the channel; a pair of flat leaf springs extending partially across the film channel and adapted to engage the pressure plate in the approximate center of the channel and on the opposite sides of the aperture to resiliently urge the pressure plate against the film; together with a handle secured to the pressure plate whereby it may be lifted out of the channel and offset at least partially to one side thereof, and retaining means to hold it out of the channel to permit insertion or removal of the film.

7. In a film gate, the combination of a frame including an aperture and a film channel extending across the aperture, with longitudinally extending friction surfaces in the channel, and side walls at the opposite edges thereof; a pressure plate including an aperture in registry with the aperture of the frame and friction surfaces on the pressure plate adapted to engage the film and urge it against the friction surfaces within the channel; spring means adapted to engage the pressure plate to resiliently urge the pressure plate against the film; together with a handle secured to the pressure plate whereby it may be lifted out of the channel and offset at least partially to one side thereof, and retaining means to hold it out of the channel to permit insertion or removal of the film.

8. In a film gate, the combination of a frame including an aperture and a film channel extending across the aperture; the channel comprising a shallow groove extending longitudinally across the frame with longitudinally extending friction surfaces therein, and side walls at the opposite edges of the groove; a pressure plate including an aperture in registry with the aperture of the frame and friction surfaces on the pressure plate adapted to engage the film and urge it against the friction surfaces within the channel; spring means to resiliently urge the pressure plate against the film; and means to lift the pressure plate from the channel and shift it at least partially to one side thereof to rest against the frame surface outside of the channel and permit insertion or removal of the film.

9. In a film gate, the combination of a frame including an aperture and a film channel extending across the aperture, with longitudinally extending friction surfaces in the channel, and side walls at the opposite edges thereof; a pressure plate including an aperture in registry with the aperture of the frame and friction surfaces on the pressure plate adapted to engage the film and urge it against the friction surfaces within the channel; a handle secured to the pressure plate whereby it may be lifted out of the channel and offset at least partially to one side thereof; retaining surfaces between the frame and the pressure plate adapted to hold the plate out of the channel when offset therefrom to hold the channel open for insertion or removal of the film; together with a pair of flat leaf springs each having one end secured to the frame with the opposite ends extending partially across the film channel and adapted to engage the pressure plate in the approximate center of the channel and on the opposite sides of the aperture to resiliently urge the pressure plate against the film when the plate is in the channel, or against the retaining surfaces between the frame and the pressure plate to hold it out of the channel and in offset position when the channel is open.

OTTO R. NEMETH.

REFERENCES CITED

The following references are of record in the file of this patent:

UNITED STATES PATENTS

| Number | Name | Date |
|---|---|---|
| 1,348,626 | Coatsworth | Aug. 3, 1920 |
| 1,780,945 | Sapier | Nov. 11, 1930 |
| 1,869,852 | Kindelmann | Aug. 2, 1932 |
| 2,232,811 | Sperry | Feb. 25, 1941 |
| 2,303,633 | Guercio | Dec. 1, 1942 |
| 2,373,052 | Rausch | Apr. 3, 1945 |

FOREIGN PATENTS

| Number | Country | Date |
|---|---|---|
| 644,729 | France | June 18, 1928 |